3,661,974
2-CARBALKOXY-PHENYL SULFENAMIDES
John C. Grivas, South Holland, Ill., assignor to The Sherwin-Williams Company, Cleveland, Ohio
No Drawing. Filed Apr. 27, 1970, Ser. No. 32,369
Int. Cl. C07c 145/00
U.S. Cl. 260—470                                      10 Claims

ABSTRACT OF THE DISCLOSURE

The compounds disclosed herein are benzene sulfenamides and derivatives thereof having the formula

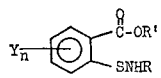

wherein R is hydrogen, hydrocarbon or substituted hydrocarbon as defined hereinafter, R' is hydrocarbon or substituted hydrocarbon as defined hereinafter, Y is an inert group, and n is an integer of 0 to 2 value. The process used for preparing these compounds involves the steps of halogenating an ester of 2-mercaptobenzoic acid or a derivative thereof and reacting the resultant halogenated intermediate with ammonia or a primary amine containing the desired R radical therein. These compounds are useful as intermediates in the preparation of cyclized derivatives useful for pharmaceutical purposes.

BACKGROUND OF THE INVENTION

Field of the invention

This invention relates to new derivatives of esters of 2-mercaptobenzoic acid. More specifically, it relates to new derivatives having the mercapto group converted to sulfenamide groups. It also relates to the process for preparing such new derivatives.

Related prior art

U.S. Pat. 3,012,039 describes 1,2-benzisothiazolinone derivatives of the formula

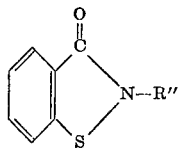

wherein R" is defined as various hydrocarbon groups and derivatives thereof. As pointed out in this patent, these compositions are very useful in the control of bacterial and fungal growth and also for use in pharmaceutical formulations for human and veterinary medicine such as for local treatment for athlete's foot and ringworm of the scalp, as general or urinary antiseptics, etc.

U.S. Pat. 2,870,015 claims certain 1,2-benzisothiazolinones as stabilizers for photographic silver halide emulsions. These compounds are prepared from a common precursor, methyl 2-mercaptobenzoate (I) by two general methods as illustrated in Scheme I (L. L. Bambas in "The Chemistry of Heterocyclic Compounds," vol. 4, A. Weissberger, Editor, Interscience Publishers, Inc., New York, N.Y., 1952, pp. 253–277).

Scheme I

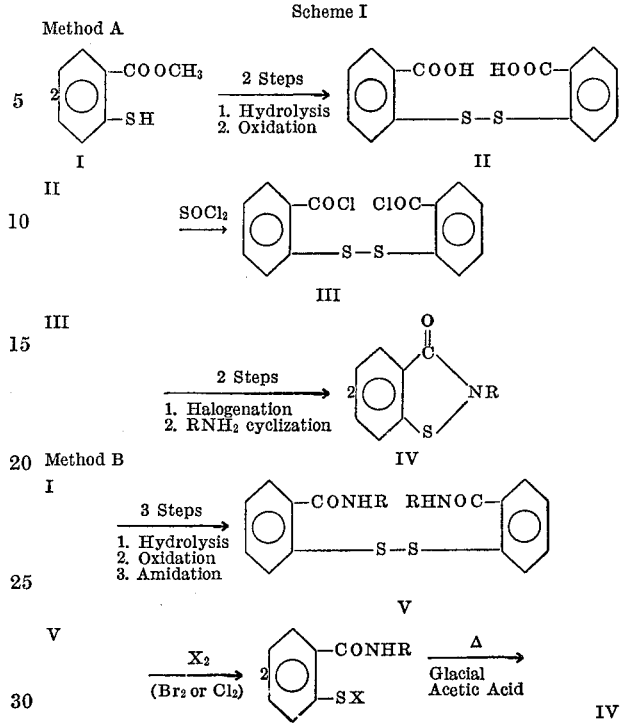

Methods A and B involve a sequence of 5 and 6 steps respectively utilizing the same starting compound (I). This precursor, in turn, is prepared from commercially available methyl anthranilate by diazotization followed by reaction with a sulfur source.

SUMMARY OF THE INVENTION

In accordance with the present invention new compounds have been found which are useful as intermediates in the preparation of the desired ultimate compounds by a novel, relatively simple, one-step procedure, and give improved yields and other advantages. These intermediate compounds are prepared by a two-step (halogenation and amidation) process and have the formula

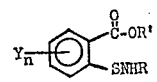

wherein:

R represents hydrogen, a hydrocarbon radical of not more than 20 preferably not more than 8 carbon atoms, including aliphatic, cycloaliphatic and aromatic hydrocarbon groups, saturated or unsaturated in the aliphatic portions thereof, hydroxy alkyl radicals of not more than 8 carbon atoms, halogenated aromatic hydrocarbon groups in which the halogen is attached to an aromatic nucleus, pyrimidyl and pyridyl radicals, the pyrimidyl and pyridyl groups being attached to the N of the formula through carbon atoms of the respective ring structures;

R' represents a hydrocarbon radical of not more than 20 and preferably not more than 5 carbon atoms, including aliphatic, cycloaliphatic and aromatic radicals, the aliphatic portions thereof preferably being saturated;

Y represents a radical which will remain inert during the reactions used in preparing the compounds and in subsequent cyclization reactions described herein; and $n$ is an integer having a value of 0 to 2.

The halogenation is advantageously conducted in a solvent. Carbon tetrachloride is preferred, but other halogenated hydrocarbons such as chloroform, carbon tetrabromide, bromoform, ethylene dichloride, trichloroethylene, tetrachloroethylene, tetrachloroethane, chlorobenzene, bromobenzene, etc., hydrocarbons such as benzene, toluene, xylene, etc., ethers such as diethyl, dipropyl, dibutyl, diamyl, diphenyl, dibenzyl ethers, etc., esters, methyl acetate, ethyl acetate, methyl butyrate, ethyl butyrate, methyl caprylate, methyl benzoate, etc., can also be used. While some chlorination of some of these solvents may occur, this does not defeat the purpose, but merely requires more halogen to complete the desired reaction. The important property of the solvent and any halogenation products that may be derived therefrom, is the solvent power for the starting reagent and its halogenated derivative. The HX is allowed to escape, or is driven off by raising the temperature.

The halogenation proceeds easily in the temperature range of 0° to 50° C., preferably 10° to 30° C.

Stoichiometric amounts or slight excess of the halogen are used. Excessive amounts are avoided so as not to produce more highly halogenated byproducts.

The amidation proceeds favorably at temperatures of 0° to 50° C., but higher temperatures may be desirable with higher molecular weight compounds.

In the subsequent amidation reaction, a primary amine is reacted in a ratio of two moles of amine or slight excess thereof per mole of halogenated thio compound. The amine hydrohalide byproduct precipitates from the solution and is filtered from the solution. The acid binding portion of the primary amine can be replaced by other suitable binding agents such as tertiary aliphatic, tertiary aromatic and other tertiary amines, e.g., triethylamine, tripropylamine, tributylamine, dimethylbenzylamine, diethylcyclohexylamine, dialkylanilines and the like. Other suitable acid binding agents are alkali metal salts of weak acids, such as sodium carbonate, sodium bicarbonate, potassium carbonate, lithium carbonate and the like.

The solvent can be evaporated to yield the solid or liquid sulfenamides of this invention. Alternatively, a concentrated solution of the product can be added to a higher boiling polar solvent, such as an alcohol, which is more favorable to ultimate cyclization, and the carbon tetrachloride or other original solvent is removed by vaporization, leaving the sulfenamide dissolved in the polar solvent.

The process of this invention by which these new compounds are prepared involves the following steps in which X represents chlorine or bromine:

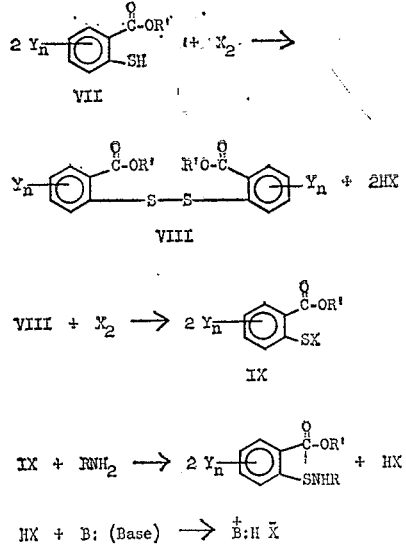

The corresponding sulfuryl halides may also be used for the initial halogenation step. Also, in place of the mercapto starting compound, the corresponding disulfide compound may be used for the halogenation. A number of the simpler mercapto esters and ester disulfide compounds are available commercially, such as methyl 2-mercaptobenzoate and the corresponding disulfide. Higher esters can be prepared by ester interchange or alcoholysis to replace the methyl group by other groups. However, since this group is removed and generally discarded in subsequent cyclization, the methyl group is preferred because of its lower weight and availability.

As shown in the prior art, it is possible to prepare mercapto esters having various Y groups by starting with anthranilic acid derivatives having the desired Y groups attached and then replacing the amine group with a mercapto group by means of a diazonium reaction. The ester group can also be introduced by esterifying the anthranilic acid derivative. By this means starting compounds can be prepared having Y groups, such as Cl, Br NO$_2$, carboalkoxy (—COOR'), alkyl, aryl, cycloalkyl, alkoxy, aryloxy, cycloalkoxy, and the like, attached to the aromatic nucleus of the formula. Preferably there is no more than one nitro group or one carboalkoxy present per compound.

Typical mercapto esters that can be used as starting compounds in the practice of this invention include:

Methyl 2-mercapto-benzoate
Phenyl 2-mercapto-benzoate
Butyl 2-mercapto-benzoate
Cyclohexyl 2-mercapto-benzoate
Methyl 5-nitro-2-mercaptobenzoate
Ethyl 4-nitro-2-mercaptobenzoate
Propyl 5-chloro-2-mercaptobenzoate
Methyl 3,5-dichloro-2-mercaptobenzoate
Methyl 3,5-diethoxy-2-mercaptobenzoate
Ethyl 4,6-dimethyl-2-mercaptobenzoate
Methyl 4-butyl-2-mercaptobenzoate
Methyl 4-benzyl-2-mercaptobenzoate
Methyl 4-cyclohexyl-2-mercaptobenzoate
Methyl 5-phenyl-2-mercaptobenzoate
Methyl 5-phenoxy-2-mercaptobenzoate
Diphenyl 2-mercapto-terephthalate In the compounds represented by the above formulas, typical R' groups include methyl, ethyl, propyl, butyl, amyl, hexyl, nonyl, decyl, dodecyl, octadecyl, phenyl, tolyl, xylyl, phenethyl, benzyl, naphthyl, diphenyl, methylnaphthyl, cyclohexyl, cycloheptyl, methylcyclohexyl, cyclohexylmethyl. Other groups such as alkenyl groups and derivatives of the above hydrocarbon groups are also suitable for this purpose. However, since the group is eliminated and discarded eventually in the cyclization reaction, it is advantageous to use simple groups such as methyl, ethyl, etc.

Typical R groups include the hydrocarbon radicals listed above for R' and also the following: hydroxyalkyl radicals such as methylol, ethylol, propylol, amylol, phenylol, hexylol, octylol, etc., haloaryl such as chlorophenyl, chlorobenzyl, chloronaphthyl, chlorodiphenyl, bromophenyl, bromobenzyl, bromonaphthyl, iodophenyl, fluorophenyl, chlorophenethyl, etc., 2-pyrimidyl, 4-pyrimidyl, 2-pyridyl, 4-pyridyl, allyl, butenyl, styryl, vinylphenyl, cyclohexenyl, propargyl, methoxyethyl, ethoxyethyl, butoxyethyl, propoxypropyl, ethoxyoctyl, cyclohexoxyethyl, phenoxybutyl, ethoxycyclohexyl, butoxyphenyl, etc.

The Y radicals include chloro, bromo, nitro, carboalkoxy (—COOR'), alkoxy, cycloalkoxy, aryloxy, hydrocarbon and substituted hydrocarbon radicals of on more than 20 and preferably no more than 5 carbon atoms, and preferably containing no aliphatic unsaturation, the substituent groups in the substituted hydrocarbon radicals being selected from alkoxy, cycloalkoxy, aryloxy, chloro and bromo groups, each of the halogen atoms being attached to an aromatic nucleus in the hydrocarbon radical. Two Y radicals can represent divalent radical which has both valencies attached to the benzene nucleus of the formula and thereby forms a second cyclic structure such as in naphthalene derivatives. Preferably no more than one Y in a compounds represents $NO_2$ or $COOR'$.

Typical Y radicals include the hydrocarbon radicals listed above for R', the bromo and chloro aromatic hydrocarbon groups listed above for R, and also chloro, bromo, nitro, alkoxy, aryloxy, cycloalkoxy, alkoxyalkyl, alkoxyaryl, etc., such as methoxy, ethoxy, propoxy, butoxy, hexoxy, decoxy, dodecoxy, phenoxy, methylphenoxy, ethylphenoxy, phenethoxy, benzyloxy, methoxyphenoxy, methoxynaphthyloxy, diphenyloxy, chlorophenoxy, bromophenoxy, chlorobenzyloxy, methoxybenzyloxy, cyclohexyloxy, methoxyethoxy, ethoxyethoxy, methoxyethyl, ethoxyethyl, propoxypropyl, butoxyethyl, methylcycloheptyloxy, and the like.

Typical sulfenamide compounds of this invention include:

N-benzyl-2-carbomethoxybenzenesulfenamide
N-cyclohexyl-2-carbomethoxybenzenesulfenamide
N-propyl-2-carbomethoxybenzenesulfenamide
N-butyl-2-carboethoxybenzenesulfenamide
N-octyl-4-nitro-2-carbopropoxybenzenesulfenamide
N-allyl-2-carbomethoxybenzenesulfenamide
N-(2-hydroxyethyl)-5-chloro-2-carbomethoxybenzensulfenamide
N-phenyl-3,5-dichloro-2-carbomethoxybenezenesulfenamide
N-(2-pyrimidyl)-2-carbomethoxybenzenesulfenamide
N-(o-chlorophenyl)-4-bromo-2-carbophenoxybenzenesulfenamide
N-(m-chlorophenyl)-4-ethyl-2-carbodecoxybenzenesulfenamide
N-(3,4-dichlorophenyl)-4,6-dimethyl-2-carbonaphthoxybenzenesulfenamide
N-(p-methoxyphenyl)-5-butyl-2-carbonaphthoxybenzenesulfenamide
N-(p-ethoxyphenyl)-2-carbomethoxybenzenesulfenamide
N-(2',5'-dimethoxyphenyl)-2-carbomethoxybenezenesulfenamide
N-(p-butoxyphenyl)-2-carbomethoxybenzenesulfenamide
N-(p-n-dodecylphenyl)-2-carbomethoxybenzenesulfenamide
N-(2',6'-diethylphenyl)-2-carbomethoxybenzenesulfenamide
N-octadecyl-2-carbomethoxybenzenesulfenamide
N-(p-chlorobenzoyl)-2-carbomethoxybenzenesulfenamide
N-(2',6'-dichlorobenzyl)-2-carbomethoxybenzenesulfenamide
N-(2',4',5'-trichlorobenzyl)-2-carbomethoxybenzenesulfenamide
N-alpha-pyridyl-2-carbomethoxybenzenesulfenamide
N-(5'-bromopyrid-2'-yl)-2-carbomethoxybenzenesulfenamide
N-(4'-pyridyl)-2-carbomethoxybenzenesulfenamide
N-pyrimid-2'-yl-2-carbomethoxybenzenesulfenamide
N-(4',6'-dimethylpyrimid-2'-yl)-2-carbomethoxybenzenesulfenamide
N-(alpha-naphthyl)-2-carbomethoxybenzenesulfenamide Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight. Temperatures are given in degrees centigrade.

EXAMPLE I

Preparation of N-benzyl-2-carbomethoxybenzenesulfenamide

A solution of bromine (64 g., 0.4 mole) in carbon tetrachloride (200 ml.) is added dropwise with stirring to a solution of methyl 2-mercaptobenzoate (67.4 g., 0.4 mole) in carbon tetrachloride (100 ml.) at 25–30°. The red solution of the sulfenyl bromide obtained is stirred at room temperature for one hour, and added dropwise to a stirred solution of benzylamine (42.9 g., 0.4 mole) triethylamine (60.7 g., 0.6 mole) and carbon tetrachloride (1 liter). The precipitated triethylamine hydrobromide is filtered off and the filtrate is evaporated to dryness under vacuum to yield an oil, which is dissolved in methanol (100 ml.) and cooled. Almost pure product (87.9 g., M.P. 58–61°) is thus obtained in 80% theoretical yield. The analytical sample (M.P. 61–62.5°) is prepared by recrystallization from methanol.

*Analysis.*—Calculated for $C_{15}H_{15}NO_2S$ (percent): C, 65.91; H, 5.53; N, 5.12; S, 11.73. Found (percent): C, 66.15; H, 5.70; N, 5.10; S, 11.49.

EXAMPLE II

Preparation of N-cyclohexyl-2-carbomethoxybenzenesulfenamide

A solution of bromine (3.2 g., 0.02 mole) in carbon tetrachloride (20 ml.) is added dropwise with stirring to a suspension of dimethyl 2,2'-dithiodibenzoate (6.7 g., 0.02 mole) in carbon tetrachloride (20 ml.) over a period of 15 minutes. The red solution obtained is stirred for 30 minutes, and added with stirring and cooling (25–30°) to a solution of cyclohexylamine (4 g., 0.04 mole) and ariethylamine (5.1 g., 0.05 mole) in carbon tetrachloride (100 ml.). After the addition has been completed, the mixture is stirred at room temperature for one hour, filtered from triethylamine hydrobromine, the filtrate is extracted with water (2× 50 ml.), dried ($MgSO_4$) and evaporated to dryness yielding crude product as an oil in theoretical yield. This oil can not be distilled at 200° (0.1 mm.) since it decomposes. Purification by column chromotography on silica gel gives an analytical sample, which is an homogeneous oil (tlc), $n_D^{25}$ 1.5833. IR and NMR data confirm the structure.

*Analysis.*—Calculated for $C_{14}H_{19}NO_2S$ (percent): C, 63.36; H, 7.32; N, 5.28. Found (percent): C, 63.61; H, 7.35; N, 5.13.

EXAMPLE III

Preparation of N-propyl-2-carbomethoxybenzenesulfenamide

To a stirred suspension of dimethyl 2,2'-dithiodibenzoate (33.4 g., 0.1 mole) in carbon tetrachloride (100 ml.) is added dropwise at 15–20° a solution of bromine (16 g., 0.1 mole) in carbon tetrachloride (50 ml.). The red solution obtained is stirred at room temperature for one hour and added dropwise at 15–20° to a solution of propylamine (32.6 g., 0.44 mole) in carbon tetrachloride (400 ml.). After the addition has been completed, the mixture is stirred at room temperature for one hour, the precipitated propylamine hydrobromide is filtered off, and the filtrate is evaporated to dryness under vacuum giving an oil. This oil is dissolved in ether, decolorized with charcoal and brought to dryness to yield highly pure product ($n_D^{25}$ 1.5764). IR and NMR data, elemental analysis on this product confirm the assigned structure.

*Analysis.*—Calculated for $C_{11}H_{15}NO_5S$: (percent): C, 58.64; H, 6.71; N, 6.22; S, 14.23. Found (percent): C, 58.47; H, 6.77; N, 6.04; S, 14.25.

EXAMPLE IV

Preparation of N-phenyl-2-carbomethoxybenzenesulfenamide

A solution of bromine (6.4 g., 0.04 mole) in carbon tetrachloride (20 ml.) is added dropwise to a solution of methyl 2-mercaptobenzoate (6.7 g., 0.04 mole) in carbon tetrachloride (40 ml.). During the addition hydrogen bromide is evolved and the intermediate dimethyl 2,2'-dithiodibenzoate is precipitated. The final solution of 2-carbomethoxybenzenesulfenyl bromide obtained is stirred at room temperature for one hour and added dropwise to a solution of aniline (9.3 g., 0.1 mole) in carbon tetrachloride (200 ml.). The resulting mixture is stirred at room temperature for an additional three hours. The precipitated solid is filtered off, and stirred in water (200 ml.) to remove aniline hydrobromide yielding crude product (6.8 g., M.P. 145–146°). A sample (2 g.) is recrystallized twice from methanol to afford the analytical species (1.7 g., M.P. 154–155.5°).

*Analysis.*—Calculated for $C_{14}H_{13}NO_2S$ (percent): C, 64.84; H, 5.05; N, 5.40; S, 12.37. Found (percent): C, 64.63; H, 5.03; N, 5.27; S, 12.55.

EXAMPLE V

Preparation of N-(2-pyrimidyl)-2-carbomethoxybenzenesulfenamide

To a stirred suspension of dimethyl 2,2'-dithiodibenzoate (33.4 g., 0.1 mole) in carbon tetrachloride (100 ml.) is added a solution of bromine (16 g., 0.1 mole) in carbon tetrachloride (100 ml.) dropwise at 20–25°. The red solution obtained is stirred at room temperature for one hour and added to a solution of 2-aminopyrimidine (20 g., 0.21 mole), triethylamine (21.2 g., 0.21 mole) and carbon tetrachloride (400 ml.). After the addition has been completed the mixture is stirred for one hour. The precipitated solid is filtered off, treated with water (300 ml.) to remove triethylamine hydrobromide, and recrystallized from methanol. The crude product (28.7 g., M.P. 147–150°) is isolated in 55% theoretcial yield. A portion of this product (10 g.) is recrystallized three times from methanol, yielding 6.9 g. of an analytical sample, M.P. 157–158°. IR and NMR spectra confirm the structure of the compound.

*Analysis.*—Calculated for $C_{12}H_{11}N_3O_2S$ (percent): C, 55.16; H, 4.24; N, 16.08; S, 12.27. Found (percent): C, 54.99; H, 4.31; N, 16.01; S, 12.22.

EXAMPLE VI

The procedure of Example I is repeated a number of times using individually in place of the methyl 2-mercaptobenzoate equivalent amounts respectively of the following esters:

(a) Phenyl 2-mercaptobenzoate
(b) Butyl 4-nitro-2-mercaptobenzoate
(c) Cyclohexyl 4-butyl-2-mercaptobenzoate
(d) Methyl 5-nitro-2-mercaptobenozate
(e) Propyl 5-chloro-2-mercaptobenzoate
(f) Dimethyl 2-mercaptoterephthalate The following sulfenamides are obtained respectively:

(a) N-benzyl-2-carbophenoxybenzenesulfenamide
(b) N-benzyl-5-nitro-2-carbobutoxybenzenesulfenamide
(c) N-benzyl-5-butyl-2-carbocyclohexoxybenzenesulfenamide
(d) N-benzyl-4-nitro-2-carbomethoxybenzenesulfenamide
(e) N-benzyl-4-chloro-2-carbopropoxybenzenesulfenamide
(f) N-benzyl-2,4-bis (carbomethoxy) benzenesulfenamide

EXAMPLE VII

The procedure of Example IV is repeated a number of times using individually in place of the methyl 2-mercaptobenzoate an equivalent amount respectively of each of the following esters:

(a) Methyl 3,5-dichloro-2-mercaptobenzoate
(b) Methyl 3,5-diethoxy-2-mercaptobenzoate
(c) Ethyl 4,6-dimethyl-2-mercaptobenzoate
(d) Methyl 4-butyl-2-mercaptobenzoate
(e) Methyl 4-benzyl-2-mercaptobenzoate
(f) Methyl 4-cyclohexyl-2-mercaptobenzoate
(g) Methyl 5-phenyl-2-mercaptobenzoate
(h) Methyl 5-phenoxy-2-mercaptobenzoate The following sulfenamides are obtained respectively:

(a) N-phenyl-4,6-dichloro-2-carbomethoxybenzenesulfenamide
(b) N-phenyl-4,6-diethoxy-2-carbomethoxybenzenesulfenamide
(c) N-phenyl-3,5-dimethyl-2-carbomethoxybenzenesulfenamide
(d) N-phenyl-5-butyl-2-carbomethoxybenzenesulfenamide
(e) N-phenyl-5-benzyl-2-carbomethoxybenzenesulfenamide
(f) N-phenyl-5-cyclohexyl-2-carbomethoxybenzenesulfenamide
(g) N-phenyl-4-phenyl-2-carbomethoxybenzenesulfenamide
(h) N-phenyl-4-phenoxy-2-carbomethoxybenzenesulfenamide.

EXAMPLE VIII

The procedure of Example is repeated a number of times using individually in place of the bromine equivalent amounts respectively of:

(a) Chlorine (gas fed into solution and weight measured as loss in weight of small pressurized container)
(b) Sulfuryl chloride added dropwise
(c) Sulfuryl bromide added dropwise In each case the corresponding halogenated thioderivative is obtained and upon reaction with benzyl amine this gives the same product that is obtained in Example I.

EXAMPLE IX

The procedure of Example I is repeated a number of times with similar results using in place of the carbon tetrachloride as the solvent for the mercaptobenzoate equal weights respectively of chloroform, ethylene dichloride, tetrachloroethane, benzene, octane, dipropyl ether and butyl acetate.

EXAMPLE X

A solution of N-benzyl-2-carbomethoxybenzenesulfenamide (2.7 g., 0.01 mole) and 0.45 ml. of 20% methanolic tetramethylammonium hydroxide in isopropanol (8 ml.) is refluxed for 10 minutes and cooled. The crystallized solid is filtered off and dried giving almost pure product (1.6 g., M.P. 86–88° C.) in 67% theoretical yield of 2-benzyl-1,2-benzisothiazolin-3-one. This has the formula

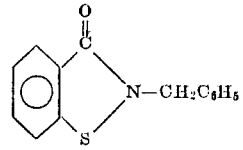

EXAMPLE XI

The procedure of Example I is repeated using an equivalent amount of p-chlorobenzylamine in place of the benzylamine. The resultant N-p-chlorobenzyl-2-carbomethoxybenzenesulfenamide is treated according to the procedure of Example X to produce 2-p-chlorobenzyl-1,2-benzisothiazolin-3-one.

EXAMPLE XII

The procedure of Example I is repeated using an equivalent amount of ammonia in place of the benzylamine. The sulfenyl bromide from the first step of the reaction is added to the liter of carbon tetrachloride containing the triethylamine and then gaseous ammonia is fed very slowly into the reaction solution from a weighed pressurized container until a slight excess over the desired amount of ammonia has been added. Stirring is continued for a few minutes and then the precipitated triethylamine hydrobromide is filtered off and the product recovered as in Example I. The 2-carbomethoxybenzenesulfenamide is cyclized according to the procedure of Example X to give 1,2-benzisothiazolin-3-one.

EXAMPLE XIII

One part of 2-p-chlorobenzyl-1,2-benzisothiazolin-2-one, 66.5 parts of arachis oil, 11 parts of anhydrous lanolin, 17 parts of soft paraffin and 5.5 parts of hard paraffin are thoroughly mixed, giving a mixture suitable for topical application for therapeutic purposes.

EXAMPLE XIV

One part of 2-p-chlorobenzyl-1,2-benzisothiazolin-3-one and 99 parts of isopropanol are thoroughly mixed giving a mixture suitable for topical application for therapeutic purposes.

EXAMPLE XV

A mixture of 0.5 part of 2-p-chlorobenzyl-1,2-benzisothiazolin-3-one, 10 parts of anhydrous citric acid, 4.23 parts of lactose and 0.02 part of sodium diisopropylnaphthalene sulphonate is granulated with a sufficient quantity of ethanol. The granules are passed through a 16-mesh screen and dried at a temperature not exceeding 60° C. A mixture of 2.85 parts of anhydrous sodium carbonate, 2 parts of anhydrous sodium sulphate and 0.4 part of magnesium stearate is screened through a 20-mesh screen and mixed with the granules. The mixture is compressed between capsule-shaped punches and there are thus obtained pessaries suitable for therapeutic purposes.

The ultimate 1,2-benzisothiazolin-3-one derivatives produced by cyclization of the compounds of this invention possess useful antibacterial and antifungal activity. For example, it has been found that the 1,2-benzisothiazolin-3-ones, particularly those in which R has at least 4 carbon atoms, have high antibacterial activity against gram positive bacteria, for example, Streptococcus pyogenes K, and gram negative bacteria, for example, Salmonella dublin, and high antifungal activity against species of fungi which are of economic importance in man and domestic animals, for example Sandida alvicans and Trichophyton mentagrophytes. Moreover, they are active over a wide pH range and their activity is little affected by the presence of, for example, bile, serum and the like. These 1,2-benzisothiazolin-3-ones are suitable for controlling fungal diseases of plants. For example, the disease in oat seedlings caused by Erysiphe graminis var. avenae, the disease in tobacco seedlings cause by Peronospora tabacina, and the disease in wheat seedlings caused by Puccinia triticina are each effectively controlled by treatment with such 1,2-benzisothiazolin-3-ones.

These 1,2-benzisothiazolin-3-ones may be applied directly or indirectly for the local treatment of dermatophytoses, for example, athlete's foot and ringworm of the scalp, also as general or urinary antiseptics.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. An aromatic sulfenamide having the formula

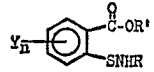

wherein
R represents hydrogen, a hydrocarbon radical of not more than 20 carbon atoms selected from the class consisting of alkyl, cycloalkyl, alkylaryl, arylalkyl and aryl radicals, a hydroxyalkyl radical of not more than 8 carbon atoms, a halogenated aromatic hydrocarbon radical in which the halogen is attached to an aromatic nucleus therein;

R' represents a hydrocarbon radical of 1–10 carbon atoms selected from the class consisting of alkyl, cycloalkyl, alkylaryl, arylalkyl and aryl hydrocarbons, the aliphatic portions of which are saturated;

Y represents chloro, bromo, nitro, alkoxy, cycloalkoxy, aryloxy, hydrocarbon or substituted hydrocarbon radical having no more than 20 carbon atoms therein said hydrocarbon group being selected from the class consisting of alkyl, cycloalkyl, alkylaryl, arylalkyl and aryl radicals, the substituent groups of said substituted hydrocarbon radical being selected from the class of alkoxy, cycloalkoxy, aryloxy, chloro and bromo radicals, said halogen substituent groups being attached to aromatic nuclei in said hydrocarbon radicals, and two Y radicals can represent a divalent radical having both valencies attached to the benzene nucleus of said formula so as to form a naphthalene nucleus; and n is an integer having a value of 0 to 2.

2. The sulfenamide of claim 1 in which said formula is

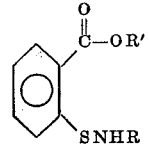

wherein R and R' are as defined in claim 1.

3. The sulfenamide of claim 2 in which R is 2-hydroxy ethyl and R' is methyl.

4. The sulfenamide of claim 2 in which R is benzyl and R' is methyl.

5. The sulfenamide of claim 2 in which R is phenyl and R' is methyl.

6. The sulfenamide of claim 2 in which R is p-chlorobenzyl and R' is methyl.

7. The sulfenamide of claim 2 in which R is cyclohexyl and R' is methyl.

8. The sulfenamide of claim 2 in which R is propyl and R' is methyl.

9. The sulfenamide of claim 2 in which R is methyl and R' is methyl.

10. The sulfenamide of claim 2 in which R is butyl and R' is ethyl.

References Cited

UNITED STATES PATENTS 3,012,039  12/1961  Morley ------------ 260—304

OTHER REFERENCES

Cram et al., "Organic Chemistry," McGraw Hill Inc. N.Y. (1959) p. 441.

LORRAINE A. WEINBERGER, Primary Examiner

J. F. TERAPANE, Assistant Examiner

U.S. Cl. X.R.

260—256.5, 294.8, 304